US012149035B2

(12) United States Patent
Bian et al.

(10) Patent No.: US 12,149,035 B2
(45) Date of Patent: Nov. 19, 2024

(54) ELECTRICAL CONNECTION ASSEMBLY AND ELECTRICAL APPARATUS

(71) Applicant: Tyco Electronics (Shanghai) Co. Ltd., Shanghai (CN)

(72) Inventors: Weifeng Bian, Shanghai (CN); Pai Rajendra, Bangalore (IN); Tian Xia, Shanghai (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 1147 days.

(21) Appl. No.: 16/921,130

(22) Filed: Jul. 6, 2020

(65) Prior Publication Data

US 2021/0013686 A1 Jan. 14, 2021

(30) Foreign Application Priority Data

Jul. 10, 2019 (CN) ......................... 201910619160.7

(51) Int. Cl.
*H01R 33/96* (2006.01)
*F21V 23/06* (2006.01)
(Continued)

(52) U.S. Cl.
CPC ............. *H01R 33/96* (2013.01); *F21V 23/06* (2013.01); *F25D 23/00* (2013.01); *F25D 25/024* (2013.01);
(Continued)

(58) Field of Classification Search
CPC .. H01R 13/73; H01R 13/7037; H01R 12/716; H01R 33/96; H01R 12/714;
(Continued)

(56) References Cited

U.S. PATENT DOCUMENTS 10,677,511 B2 * 6/2020 Kim ....................... F25D 23/028
11,104,502 B2 * 8/2021 Espinosa ................... A23L 3/01
(Continued)

FOREIGN PATENT DOCUMENTS

CN 107300286 A * 10/2017 ............. F21V 19/00

OTHER PUBLICATIONS

Office Action from the National Intellectual Property Office of Administration of China dated Mar. 28, 2023, corresponding with Application No. 201910619160.7, 18 pages.

*Primary Examiner* — William H. Mayo, III
*Assistant Examiner* — Rhadames Alonzo Miller
(74) *Attorney, Agent, or Firm* — Barley Snyder

(57) ABSTRACT

An electrical connection assembly includes a first electrical connection module configured to be mounted on a fixed member and a second electrical connection module configured to be mounted on a moving member. The first electrical connection module has a first terminal and a second terminal. The first electrical connection module has a normally open switch. The second electrical connection module has a first contact pad and a second contact pad configured to be electrically connected with the first terminal and the second terminal, respectively. The second electrical connection module has a switch controller adapted to drive the normally open switch to a closed state when the first contact pad and the second contact pad are moved to a contact position in which the first contact pad and the second contact pad are in electrical contact with the first terminal and the second terminal, respectively.

19 Claims, 7 Drawing Sheets

(51) Int. Cl.

| | |
|---|---|
| ***F25D 23/00*** | (2006.01) |
| ***F25D 25/02*** | (2006.01) |
| ***F25D 29/00*** | (2006.01) |
| ***H01R 12/71*** | (2011.01) |
| ***H01R 13/73*** | (2006.01) |
| ***H01R 33/18*** | (2006.01) |

(52) U.S. Cl.
CPC ........... *F25D 29/00* (2013.01); *H01R 12/714* (2013.01); *H01R 33/18* (2013.01); *H01R 13/73* (2013.01)

(58) Field of Classification Search
CPC ...... H01R 13/6658; H01H 3/16; F21V 23/06; F25D 2400/40; F25D 25/024; F25D 29/00
See application file for complete search history.

(56) References Cited

U.S. PATENT DOCUMENTS

| | | | | |
|---|---|---|---|---|
| 2004/0220002 | A1* | 11/2004 | Guderzo | B62J 50/22 474/80 |
| 2007/0127229 | A1* | 6/2007 | Lee | F25D 27/00 362/92 |
| 2012/0262093 | A1* | 10/2012 | Recker | H05B 47/19 315/307 |
| 2016/0211627 | A1* | 7/2016 | Planard-Luong | H01R 13/521 |
| 2017/0122654 | A1* | 5/2017 | Lee | F25D 11/02 |
| 2017/0205138 | A1* | 7/2017 | Hwang | G06Q 10/087 |
| 2017/0214277 | A1* | 7/2017 | Lee | F25D 27/005 |
| 2017/0363346 | A1* | 12/2017 | Choi | F25D 23/02 |
| 2020/0173717 | A1* | 6/2020 | Du | F25D 23/06 |
| 2021/0285715 | A1* | 9/2021 | Kim | F25D 23/025 |

* cited by examiner

ELECTRICAL CONNECTION ASSEMBLY AND ELECTRICAL APPARATUS

CROSS-REFERENCE TO RELATED APPLICATION

This application claims the benefit of the filing date under 35 U.S.C. § 119(a)-(d) of Chinese Patent Application No. 201910619160.7, filed on Jul. 10, 2019.

FIELD OF THE INVENTION

The present invention relates to an electrical connection assembly and, more particularly, to an electrical connection assembly connecting a fixed member and a moving member.

BACKGROUND

In some electrical apparatus, some electrical loads are installed on a moving member, for example, an illumination lamp is installed on a movable shelf of a refrigerator. A first electrical connection module is provided on the movable shelf, and a second electrical connection module to mate with the first electrical connection module must also be provided on an inner wall of the refrigerator. When the movable shelf is inserted into the refrigerator, the first electrical connection module is mated with the second electrical connection module, so as to connect the lamp on the movable shelf to a power supply.

However, when the movable shelf is pulled out from the refrigerator, elastic contact arms of a pair of terminals of the first electrical connection module are exposed, and are easily accidentally contacted by people or other conductive objects, risking electric shock or the main control equipment being burnt by a short circuit.

SUMMARY

An electrical connection assembly includes a first electrical connection module configured to be mounted on a fixed member and a second electrical connection module configured to be mounted on a moving member. The first electrical connection module has a first terminal and a second terminal. The first electrical connection module has a normally open switch. The second electrical connection module has a first contact pad and a second contact pad configured to be electrically connected with the first terminal and the second terminal, respectively. The second electrical connection module has a switch controller adapted to drive the normally open switch to a closed state when the first contact pad and the second contact pad are moved to a contact position in which the first contact pad and the second contact pad are in electrical contact with the first terminal and the second terminal, respectively.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
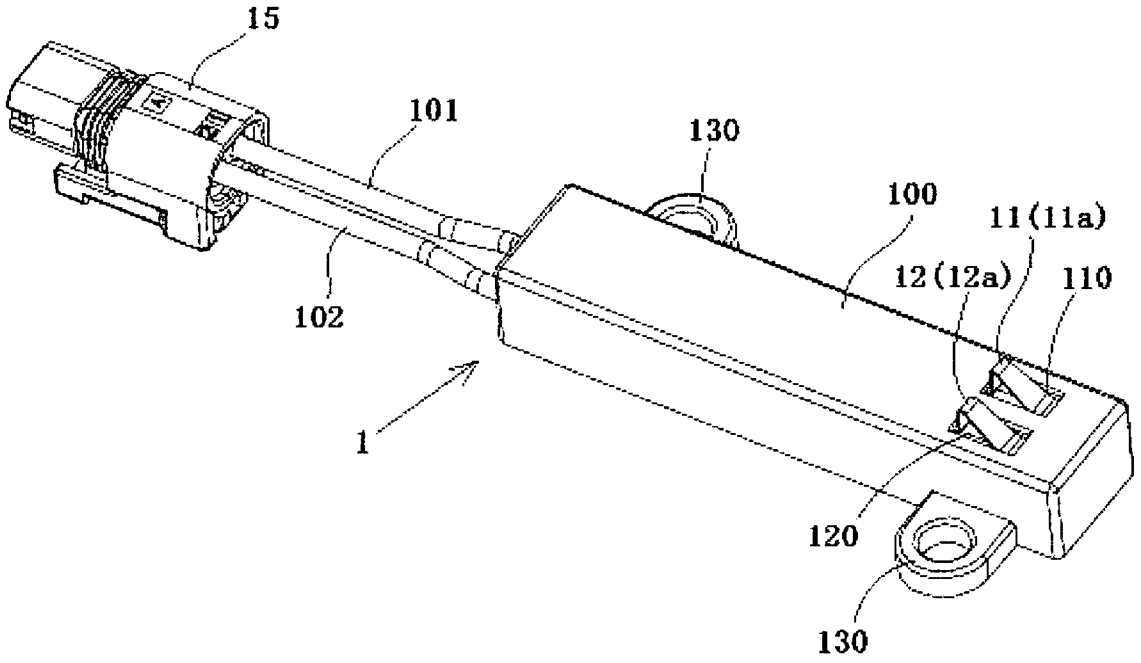
FIG. 1 is a perspective view of a first electrical connection module according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
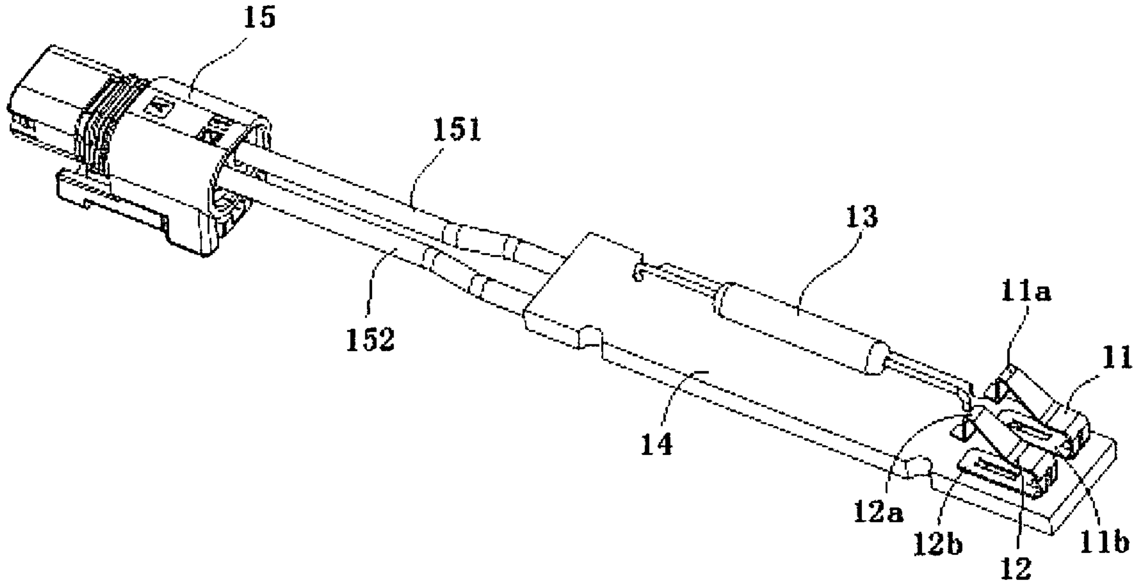
FIG. 2 is a perspective view of the first electrical connection module with a first housing removed.
Figure 3:
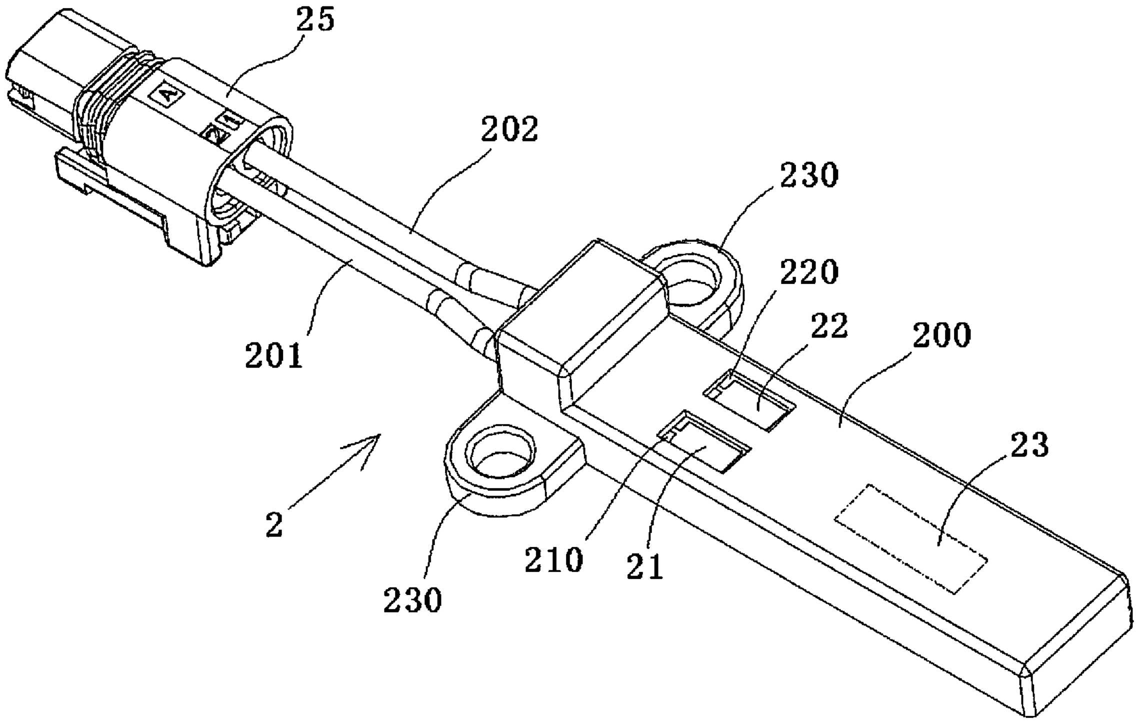
FIG. 3 is a perspective view of a second electrical connection module according to an embodiment.
Figure 4:
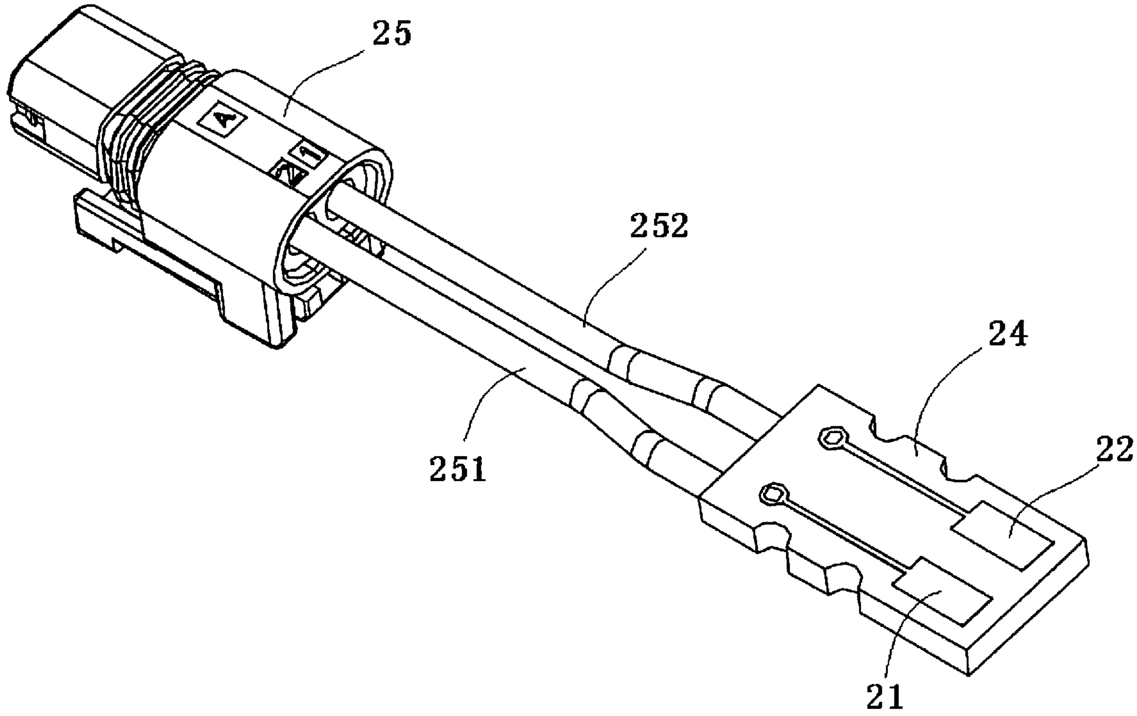
FIG. 4 is a perspective view of the second electrical connection module with a second housing removed.
Figure 5:
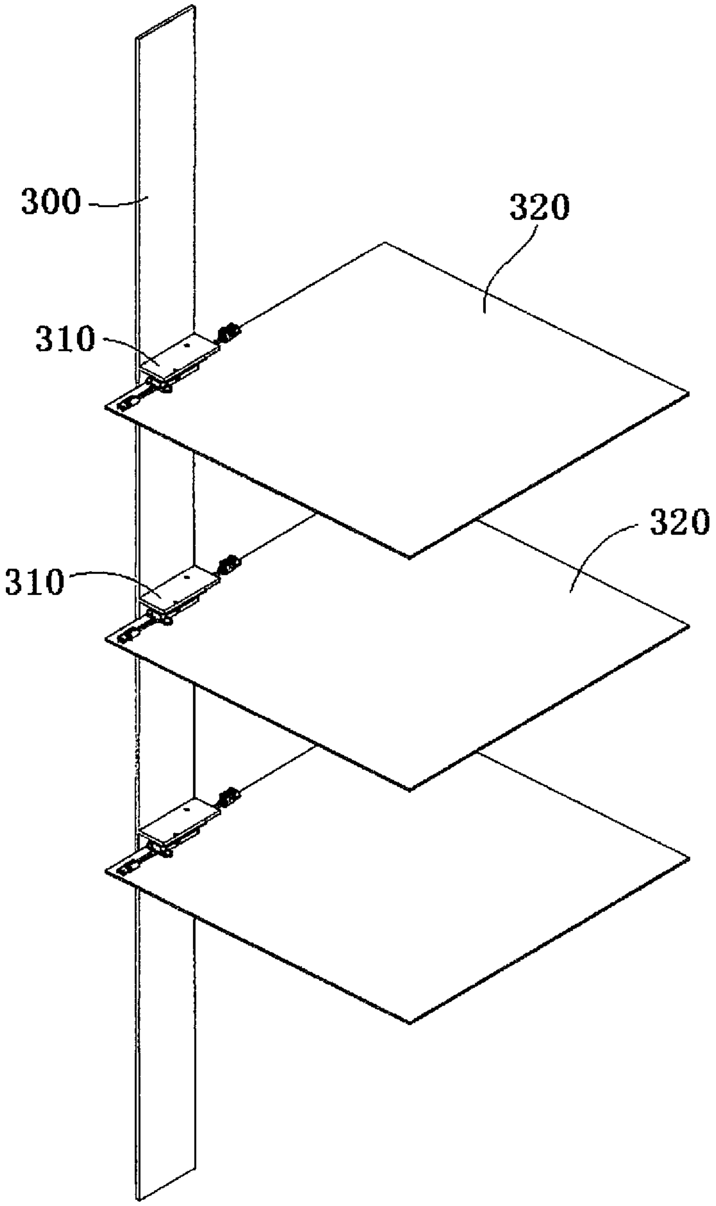
FIG. 5 is a perspective view of an electrical apparatus according to an embodiment.
Figure 6:
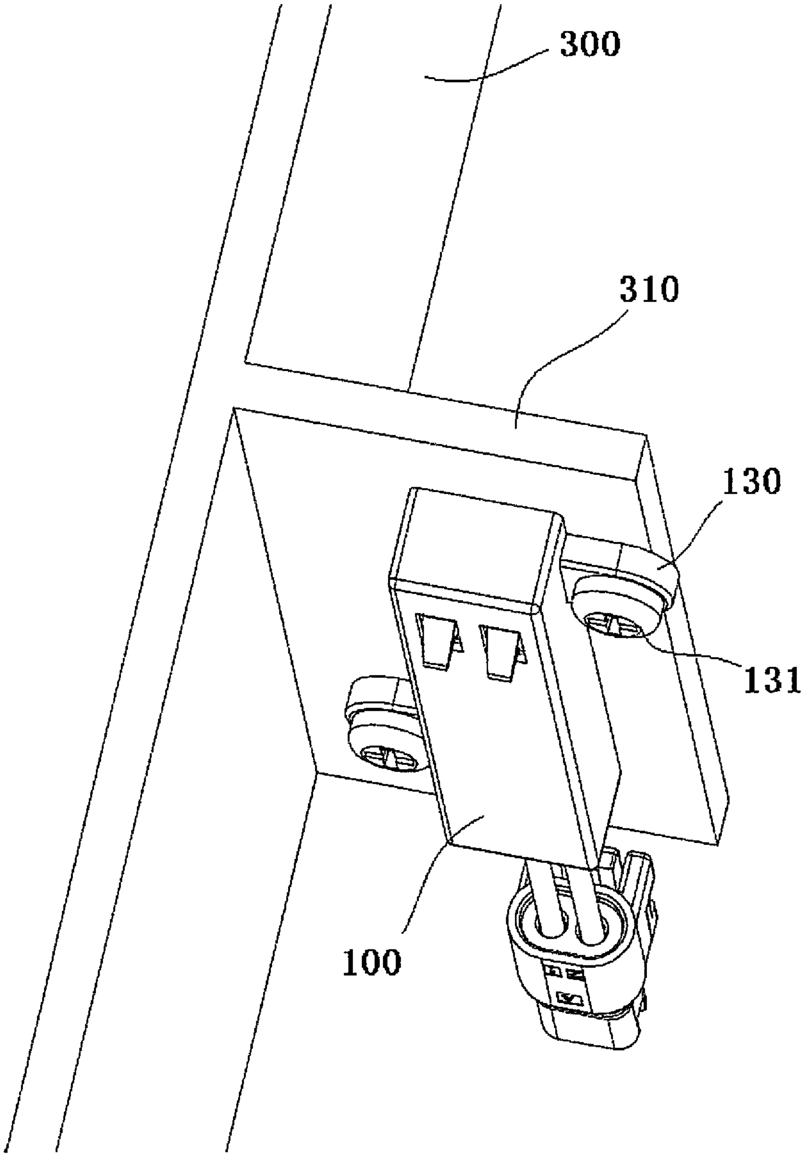
FIG. 6 is a perspective view of the first electrical connection module installed on a fixed member of the electrical apparatus.
Figure 7:
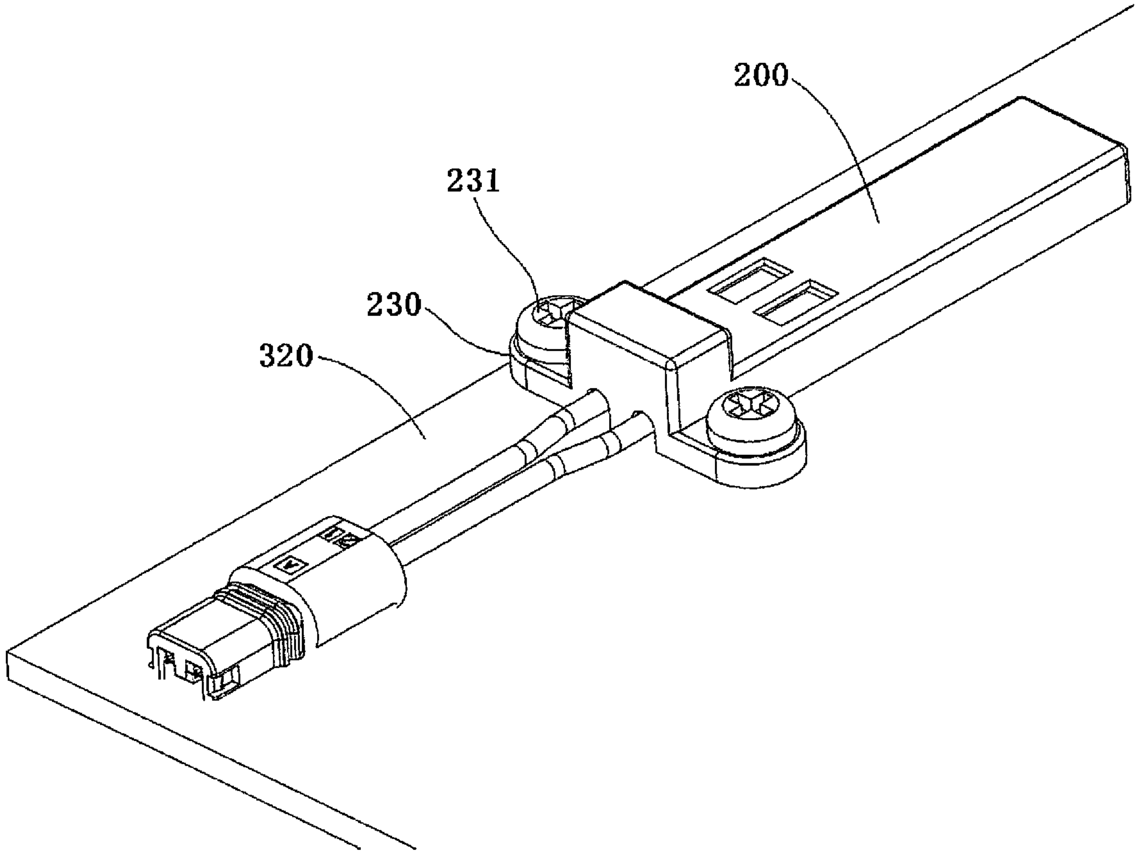
FIG. 7 is a perspective view of the second electrical connection module installed on a moving member of the electrical apparatus.

An electrical connection assembly according to an embodiment, as shown in FIGS. 5-7, comprises an electrical apparatus, a first electrical connection module 1 (see FIGS. 1-2), and a second electrical connection module 2 (see FIGS. 3-4). The first electrical connection module 1 is mounted on a fixed member 310 of the electrical apparatus. The second electrical connection module 2 is mounted on a moving member 320 of the electrical apparatus.

The first electrical connection module 1, as shown in FIGS. 1 and 2, has a first terminal 11 and a second terminal 12 adapted to electrically connect with a positive pole and a negative pole of a power supply (not shown), respectively. The first electrical connection module 1 has a normally open switch 13, as shown in FIG. 2. The normally open switch 13 is connected in series on an electrical connection line between the first terminal 11 and the positive pole of the power supply.

The second electrical connection module 2, as shown in FIGS. 3 and 4, includes a first contact pad 21 and a second contact pad 22. The first contact pad 21 and a second contact pad 22 are adapted to electrically contact with the first terminal 11 and the second terminal 12, respectively. The second electrical connection module 2 has a switch controller 23. The switch controller 23 is configured to drive the normally open switch 13 to a closed state when the first contact pad 21 and the second contact pad 22 are moved to contact positions where the first contact pad 21 and the second contact pad 22 are in electrical contact with the first terminal 11 and the second terminal 12, respectively.

In an embodiment, when the first contact pad 21 and the second contact pad 22 are moved to separation positions where the first contact pad 21 and the second contact pad 22 are separated from the first terminal 11 and the second terminal 12, respectively, the normally open switch 13 is automatically reset to its initial open state. In this way, when the movable member 320 is separated from the fixed member 310, the normally open switch 13 will disconnect the electrical connection line between the first terminal 11 and the power supply, thus enabling effective prevention of the risks of electric shock and short circuit.

In an embodiment, the normally open switch 13 may be a normally open reed, and the switch controller 23 may be a magnet. In this case, when the first contact pad 21 and the second contact pad 22 are moved to the contact positions where the first contact pad 21 and the second contact pad 22 are in electrical contact with the first terminal 11 and the second terminal 12 respectively, the magnet is moved to a position adjacent to the normally open reed, so that the normally open reed is switched from the open state to the closed state under the action of the magnetic field of the magnet. When the first contact pad 21 and the second contact pad 22 are moved to the separation positions where the first contact pad 21 and the second contact pad 22 are separated from the first terminal 11 and the second terminal 12 respectively, the magnet is moved to a position far away from the normally open reed, so that the normally open reed is automatically reset to its initial open state by its own elastic restoring force. The normally open reed herein may be any suitable type of normally open reed.

The first electrical connection module 1, as shown in FIGS. 1 and 2, has a first circuit board 14 on which the first terminal 11, the second terminal 12, and the normally open switch 13 are integrated. The first electrical connection module 1 has a first housing 100 in which the first terminal 11, the second terminal 12, the normally open switch 13 and the first circuit board 14 are accommodated. As shown in FIG. 1, in an embodiment, a first opening 110 and a second opening 120 are formed in the first housing 100, and an elastic contact part 11*a* of the first terminal 11 and an elastic contact part 12*a* of the second terminal 12 are respectively exposed through the first opening 110 and the second opening 120, so as to electrically contact with the first contact pad 21 and the second contact pad 22, respectively.

As shown in FIGS. 1-2 and 6-7, in an embodiment, a first connecting ear 130 is formed on the first housing 100. The first housing 100 is connected and fixed to the fixed member 310 by a first screwed connection part 131 passing through the first connecting ear 130, for example passing through a threaded opening of the first connecting ear 130.

As shown in FIGS. 1-2, in an embodiment, the first electrical connection module 1 includes a first connector 15. The first terminal 11 and the second terminal 12 are adapted to be electrically connected to the power supply by the first connector 15. The first connector 15 has a first connecting cable 151, a first end of which is electrically connected to a first end of the normally open switch 13 via a conductive trace on the first circuit board 14. A second end of the normally open switch 13 is electrically connected to a base end 11*b* of the first terminal 11 via a conductive trace on the first circuit board 14. The first connector 15 has a second connecting cable 152, a first end of which is electrically connected to a base end 12*b* of the second terminal 12 via a conductive trace on the first circuit board 14.

The second electrical connection module 2, as shown in FIGS. 3 and 4, has a second circuit board 24 on which the first contact pad 21 and the second contact pad 22 are integrated.

The second electrical connection module 2 has a second housing 200, in which the second circuit board 24, the first contact pad 21, the second contact pad 22, and the switch controller 23 are accommodated. The switch controller 23 is mounted on an inner wall of the second housing 200. However, the present disclosure is not limited to this; for example, the switch controller 23 may be mounted on the second circuit board 24.

As shown in FIG. 3, in an embodiment, a first opening 210 and a second opening 220 are formed in the second housing 200, and the first contact pad 21 and the second contact pad 22 are respectively exposed through the first opening 210 and the second opening 220, so as to electrically contact with the first terminal 11 and the second terminal 12, respectively.

As shown in FIGS. 3-4 and 5-7, in an embodiment, a second connecting ear 230 is formed on the second housing 200. The second housing 200 is connected and fixed to the moving member 320 by a second screwed connection part 231 passing through the second connecting ear 230, for example passing through a threaded opening of the second connecting ear 230.

In an embodiment, an electrical load is provided on the moving member 320. The positive and negative ends of the electrical load are electrically connected to the first contact pad 21 and the second contact pad 22 of the second electric connection module 2, respectively.

As shown in FIGS. 3-4 and 5-7, in an embodiment, the second electrical connection module 2 has a second connector 25. The first contact pad 21 and the second contact pad 22 are adapted to be electrically connected to the electrical load by the second connector 25. The second connector 25 has a first connecting cable 251, a first end of which is electrically connected to the first contact pad 21 via a conductive trace on the second circuit board 24. The second connector 25 has a second connecting cable 252, a first end of which is electrically connected to the second contact pad 22 via a conductive trace on the second circuit board 24.

An electrical apparatus according to an embodiment, as shown in FIGS. 5-7, includes the fixed member 310, the moving member 320, the electrical connection assembly shown in FIGS. 1-4, and an electrical load (not shown). The moving member 320 is movable relative to the fixed member 310. The first electrical connection module 1 of the electric connection assembly is installed on the fixed member 310, and the second electrical connection module 2 of the electrical connection assembly is installed on the moving member 320. The electrical load is provided on the moving member 320, a positive end and a negative end of the electrical load are electrically connected to the first contact pad 21 and the second contact pad 22 of the second electrical connection module 2, respectively.

In an embodiment, the electrical apparatus may be a refrigerator, the moving member 320 may be a movable shelf for placing thereon articles in the refrigerator, and the fixed member 310 is a shelf bracket provided on an inner wall 300 of the refrigerator, as shown in FIGS. 5 and 6. It is noted that the electrical apparatus is not limited to the refrigerator, for example, the electrical apparatus may be any other household appliances, such as, washing machine, air conditioner, etc.

As shown in FIGS. 5-7, in an embodiment, when the movable shelf is inserted into the refrigerator, the first contact pad 21 and the second contact pad 22 of the second electrical connection module 2 are moved to the contact positions where the first contact pad 21 and the second contact pad 22 electrically and respectively contact with the first terminal 11 and the second terminal 12 of the first electric connection module 1, and the switch controller 23 of the second electrical connection module 2 drives the normally open switch 13 of the first electrical connection module 1 to the closed state. When the movable shelf is pulled out of the refrigerator, the first contact pad 21 and the second contact pad 22 of the second electrical connection module 2 are moved to the separation positions where the first contact pad 21 and the second contact pad 22 are respectively separated from the first terminal 11 and the second terminal 12 of the electrical connection module 1, and the normally open switch 13 of the first electrical connection module 1 is automatically reset to its initial open state. In an embodiment, the electrical load may be an illumination lamp provided on the movable shelf of the refrigerator.

An electrical connection assembly according to an embodiment includes the first electrical connection module 1. The first electrical connection module 1 is configured to be mounted on the fixed member 310 and has the first terminal 11 and the second terminal 12 configured to electrically connect with a positive pole and a negative pole of a power supply, respectively. The first terminal 11 and the second terminal 12 are adapted to electrically and respectively contact with the first contact pad 21 and the second contact pad 22 of the second electrical connection module 2. The first electrical connection module 1 has the normally open switch 13, which is connected in series on an electrical connection line between the first terminal 11 and the positive pole of the power supply. When the first contact pad 21 and the second contact pad 22 of the second electrical connection module 2 are moved to contact positions where the first contact pad 21 and the second contact pad 22 electrically and respectively contact with the first terminal 11 and the second terminal 12, the normally open switch 13 is driven to a closed state.

It should be appreciated for those skilled in this art that the above embodiments are intended to be illustrative, and not restrictive. For example, many modifications may be made to the above embodiments by those skilled in this art, and various features described in different embodiments may be freely combined with each other without conflicting in configuration or principle. Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. An electrical connection assembly, comprising:

a first electrical connection module configured to be mounted on a fixed member, the first electrical connection module having a first terminal and a second terminal configured to be electrically connected with a positive pole and a negative pole of a power supply, respectively, the first electrical connection module has a normally open switch discrete from the first terminal and the second terminal and connected in series on an electrical connection line between the first terminal and the positive pole of the power supply; and a second electrical connection module configured to be mounted on a moving member, the second electrical connection module having a first contact pad and a second contact pad configured to be electrically connected with the first terminal and the second terminal, respectively, the second electrical connection module has a switch controller adapted to drive the normally open switch to a closed state when the first contact pad and the second contact pad are moved to a contact position in which the first contact pad and the second contact pad are in electrical contact with the first terminal and the second terminal, respectively, the switch controller drives the normally open switch independent of a contact state between the first and second terminals and the first and second contact pads.

2. The electrical connection assembly according to claim 1, wherein the normally open switch is automatically reset to an initial open state in response to the first contact pad and the second contact pad being moved to a separation position in which the first contact pad and the second contact pad are separated from the first terminal and the second terminal, respectively.

3. The electrical connection assembly according to claim 2, wherein the normally open switch is a normally open reed distinct from the first terminal and the switch controller is a magnet, a magnetic field of the magnet directly acting on and biasing the normally open read from the open state to the closed state as the first and second contact pads are moved to the contact position.

4. The electrical connection assembly according to claim 3, wherein:

the magnet, in response to the first contact pad and the second contact pad being moved to the contact position, moves to a position adjacent to the normally open reed, so that the normally open reed is switched from the initial open state to the closed state directly by the magnetic field of the magnet; and/or the magnet, in response to the first contact pad and the second contact pad being moved to the separation position, moves to a position distal from the normally open reed, so that the normally open reed is automatically reset to the initial open state by an elastic restoring force of the normally open reed.

5. The electrical connection assembly according to claim 1, wherein the first electrical connection module includes:

a first circuit board on which the first terminal, the second terminal, and the normally open switch are integrated; and a first housing in which the first terminal, the second terminal, the normally open switch, and the first circuit board are accommodated.

6. The electrical connection assembly according to claim 5, wherein the first housing has a first opening and a second opening, an elastic contact part of the first terminal and an elastic contact part of the second terminal are respectively exposed through the first opening and the second opening, so as to electrically contact the first contact pad and the second contact pad, respectively.

7. The electrical connection assembly according to claim 5, the first housing has a first connecting ear, the first housing is connected and fixed to the fixed member by a first screwed connection part passing through the first connecting ear.

8. The electrical connection assembly according to claim 5, wherein the first electrical connection module includes a first connector, the first terminal and the second terminal are adapted to be electrically connected to the power supply by the first connector.

9. The electrical connection assembly according to claim 8, wherein the first connector has a first connecting cable, a first end of the first connecting cable is electrically connected to a first end of the normally open switch via a conductive trace on the first circuit board, a second end of the normally open switch is electrically connected to a base end of the first terminal via a conductive trace on the first circuit board.

10. The electrical connection assembly according to claim 9, wherein the first connector has a second connecting cable, a first end of the second connecting cable is electrically connected to a base end of the second terminal via a conductive trace on the first circuit board.

11. The electrical connection assembly according to claim 1, wherein the second electrical connection module includes:

a second circuit board on which the first contact pad and the second contact pad are integrated; and a second housing in which the second circuit board, the first contact pad, the second contact pad, and the switch controller are accommodated; and/or the switch controller is mounted on the second circuit board or the second housing.

12. The electrical connection assembly according to claim 11, the second housing has a first opening and a second opening, the first contact pad and the second contact pad are respectively exposed through the first opening and the second opening to electrically contact with the first terminal and the second terminal, respectively.

13. The electrical connection assembly according to claim 11, the second housing has a second connecting ear, the second housing is connected and fixed to the moving member by a second screwed connection part passing through the second connecting ear.

14. The electrical connection assembly according to claim 11, wherein the second electrical connection module includes a second connector, the first contact pad and the second contact pad are adapted to be electrically connected to an electrical load by the second connector.

15. The electrical connection assembly according to claim 14, wherein the second connector has:

a first connecting cable, a first end of the second connecting cable is electrically connected to the first contact pad via a conductive trace on the second circuit board; and a second connecting cable, a first end of the second connecting cable is electrically connected to the second contact pad via a conductive trace on the second circuit board.

16. The electrical connection assembly according to claim 1, wherein the normally open switch is arranged on the connection line on a side of the first terminal opposite the first contact pad with the first and second contact pads in the contact position.

17. An electrical apparatus, comprising:

a fixed member;

a moving member movable relative to the fixed member;

an electrical connection assembly including:

a first electrical connection module mounted on the fixed member, the first electrical connection module having a first terminal and a second terminal configured to be electrically connected with a positive pole and a negative pole of a power supply, respectively, the first electrical connection module has a normally open switch discrete from the first terminal and the second terminal and connected in series on an electrical connection line between the first terminal and the positive pole of the power supply; and a second electrical connection module mounted on the moving member, the second electrical connection module having a first contact pad and a second contact pad configured to be electrically connected with the first terminal and the second terminal, respectively, the second electrical connection module has a switch controller adapted to drive the normally open switch to a closed state when the first contact pad and the second contact pad are moved to a contact position in which the first contact pad and the second contact pad are in electrical contact with the first terminal and the second terminal, respectively; and an electrical load provided on the moving member, a positive end and a negative end of the electrical load are electrically connected to the first contact pad and the second contact pad of the second electrical connection module, respectively.

18. The electrical apparatus according to claim 17, wherein:

the electrical apparatus is a refrigerator;

the moving member is a movable shelf of the refrigerator;

the fixed member is a shelf bracket provided on an inner wall of the refrigerator;

in response to the movable shelf being inserted into the refrigerator, the first contact pad and the second contact pad of the second electrical connection module are moved to a contact position in which the first contact pad and the second contact pad electrically and respectively contact with the first terminal and the second terminal of the first electric connection module, and the switch controller of the second electrical connection module drives the normally open switch of the first electrical connection module to the closed state; and in response to the movable shelf being pulled out of the refrigerator, the first contact pad and the second contact pad of the second electrical connection module are moved to a separation position in which the first contact pad and the second contact pad are respectively separated from the first terminal and the second terminal of the electrical connection module, and the normally open switch of the first electrical connection module is automatically reset to an initial open state.

19. An electrical connection assembly, comprising:

a first electrical connection module configured to be mounted on a fixed member, the first electrical connection module having a first terminal and a second terminal configured to be electrically connected with a positive pole and a negative pole of a power supply, respectively, the first electrical connection module has a normally open switch discrete from the first terminal and the second terminal and connected in series on an electrical connection line between the first terminal and the positive pole of the power supply, the first terminal and the second terminal are adapted to electrically and respectively contact with a first contact pad and a second contact pad of a second electrical connection module, the normally open switch is configured, in response to the first contact pad and the second contact pad of the second electrical connection module being moved to a contact position in which the first contact pad and the second contact pad electrically and respectively contact with the first terminal and the second terminal, to be driven to a closed state.

* * * * *